United States Patent
Van Poppel et al.

[11] Patent Number: 6,163,980
[45] Date of Patent: Dec. 26, 2000

[54] METHOD AND APPARATUS FOR CONTINUOUS DEHYDRATION OF SLUDGE

[75] Inventors: Eduardus Julius Maria Van Poppel, Berkel Enschot; Peter Carlo Rem, Rijswijk, both of Netherlands

[73] Assignees: DHV Milieu en Infrastructuur B.V., Ex Amersfoort; Technische Universiteit Delft Faculteit Technische Aardwetenschappen, Delft, both of Netherlands

[21] Appl. No.: 09/260,834

[22] Filed: Mar. 2, 1999

Related U.S. Application Data

[63] Continuation of application No. PCT/NL97/00500, Sep. 1, 1997.

[30] Foreign Application Priority Data

Sep. 3, 1996 [NL] Netherlands ............................ 1003950

[51] Int. Cl.$^7$ ...................................................... F26B 3/00
[52] U.S. Cl. .................................. 34/356; 34/424; 34/71; 34/95
[58] Field of Search ............................. 34/345, 347, 349, 34/354, 355, 356, 424, 71, 95, 179, 183

[56] References Cited

U.S. PATENT DOCUMENTS

| | | | |
|---|---|---|---|
| 2,723,954 | 11/1955 | Young | 210/2 |
| 3,859,734 | 1/1975 | Wahlgren | 34/95 |
| 3,898,745 | 8/1975 | Carlsson . | |
| 3,909,410 | 9/1975 | Neukamm | 210/71 |
| 5,522,156 | 6/1996 | Ware | 34/356 |

FOREIGN PATENT DOCUMENTS

| | | |
|---|---|---|
| 634981 | 3/1928 | France . |
| 423934 | 2/1935 | United Kingdom . |
| 1163180 | 9/1969 | United Kingdom . |

OTHER PUBLICATIONS

WO9606805, Method of drying sludge, PCT/NO95/00143, Mar. 1996.

*Primary Examiner*—Pamela Wilson
*Attorney, Agent, or Firm*—Akin, Gump, Strauss, Hauer & Feld, L.L.P.

[57] ABSTRACT

A method and apparatus is provided for continuous dehydration of sludge wherein, prior to dehydration, water is mechanically removed from the sludge, and the thus obtained sludge of cutting consistency is mixed with heated spheres. Dehydration is carried out at reduced pressure, wherein the sludge from which water has been mechanically removed is intimately mixed with the heated spheres in order to increase the heat capacity of the sludge. The dehydrated sludge and the cooled spheres are then separated from each other, the dehydrated sludge is removed, while the cooled spheres are reheated and subsequently added to fresh sludge that is to be dehydrated. The spheres are partly heated by means of water vapor coming from the sludge and partly by means of steam. The spheres are made from steel, having a diameter of 8–16 mm. The pressure in the system ranges form approx. 2 bars to approx. 0.05 bar. An apparatus is also provided for carrying out the method. The apparatus may be of the screw kind or of the turret kind.

18 Claims, 2 Drawing Sheets

METHOD AND APPARATUS FOR CONTINUOUS DEHYDRATION OF SLUDGE

CROSS REFERENCE TO RELATED APPLICATION

This application is a continuation of International Application PCT/NL97/00500, filed Sep. 1, 1997, the disclosure of which is incorporated herein by reference.

BACKGROUND OF THE INVENTION

The present invention relates to a method of continuous dehydration of sludge wherein, prior to dehydration, water is mechanically removed from the sludge and the thus obtained sludge of cutting consistency is mixed with heated spheres. The invention also relates to an apparatus for carrying out such a method.

Before discussing the prior art it is observed that the processing of sludge is one of the major problems of the immediate future. The reason is that it is difficult to remove water from sludge (mechanically). Sludge consists of (very) small particles varying from roughly 1 to 50 $\mu$m in size. When water is removed, these small particles are the cause of a clay-like structure with many pores. The water in said pores is difficult to remove by means of mechanical treatment (for instance by pressing). The content of organic matter also considerably influences the water removal properties. The source of the sludge determines its composition and consequently also its water removal properties. For instance, one may discriminate between sludge coming from the processing of polluted soil, the processing of construction and demolition rubble, (sewage) water purification installations, channel beds or industrial waste-water treatment installations.

Formerly, various kinds of sludge were used as agricultural fertilizers. Due to stricter environmental legislation and the manure surplus, this practice has virtually fallen into complete disuse. Nowadays the ensuing sludge streams are dumped or, if the sludge is heavily polluted, incinerated. At the moment the usual costs for dumping amount to 40 to 60 U.S. dollars per metric ton and incineration costs are about 250 U.S. dollars per metric ton. To keep the costs for the sludge disposal within limits, extensive water removal is advisable. Sludge from construction and demolition waste contains little organic matter, and it is generally easy to remove water mechanically to an approximate dry matter content of 65%. The sludge from soil decontaminators generally contains more organic matter, up to approx. 20%, and mechanical water removal is possible up to a dry matter content of 40–50%. The sludge from the purification of waste water sometimes contains more than 50% organic matter, so that mechanical water removal results at best in an approximate dry matter content of 20%.

Thus, for a considerable part, the processing costs for sludge are determined by the water content. A lower moisture content is practically only possible by evaporating water. However, evaporating water requires much energy, 2260 kJ per kg water. By way of comparison, this is equivalent to the amount of energy required to raise the temperature of 10 kg water by 53° C.

In the majority of dehydration installations large quantities of hot air are used to withdraw water from the material. The costs for dehydrating sludge amount to approx. 100 U.S. dollars per metric ton. In a number of cases the sludge does not need to be dumped subsequent to dehydration, because the dehydrated sludge can be used for other purposes.

The method and apparatus described in the preamble are known from WO 91/001945. The known method is carried out at atmospheric pressure. In order to obtain a large heat transferring surface, metal spheres are added to the sludge. Prior to the addition of the spheres to the sludge, they are heated to approx. 150° C. by means of hot gas. Because the dehydration process takes place in a revolving drum with a screw conveyor, mixing of the spheres with the sludge is assured, with good heat transfer. Finally, the spheres are separated from the sludge. According to this known method the apparatus is able to process a sludge stream of 5.2 metric tons per hour having a dry matter content of 15%, yielding 95% dry matter in four minutes. An important disadvantage of the known method is the large amount of hot air/gas required, which obviously means considerable energy consumption.

BRIEF SUMMARY OF THE INVENTION

The object of the invention is to provide a method and an apparatus wherein the above-mentioned disadvantage of unnecessary loss of energy is effectively removed.

To this end the invention provides a method of continuous dehydration of sludge wherein, prior to dehydration, water is mechanically removed from the sludge, and the thus obtained sludge of cutting consistency is mixed with heated spheres, characterized in that dehydration is carried out at reduced pressure, wherein the sludge from which water has been mechanically removed is intimately mixed with the heated spheres which during the dehydration process give off their heat to the sludge. The dehydrated sludge and the cooled spheres are then separated from each other, the dehydrated sludge is removed, while the cooled spheres are reheated, partly by condensation of water evaporating from the sludge, and subsequently added to fresh sludge that is to be dehydrated.

The addition of spheres is necessary to improve the heat capacity of the mixture because the heat capacity of the sludge alone does not suffice.

According to the present method it is possible to process 0.5 to 10 metric tons of sludge stream per hour, depending on the size of the dehydration installation. The energy input is roughly 10–25% of the required evaporation heat. The method according to the invention is commercially very advantageous, because the estimated price for dehydrating sludge may be less than 25 U.S. dollars per metric ton (European price level 1996).

According to the present method, water is mechanically removed from the sludge prior to dehydration with the aid of, for instance, a straining belt until said sludge is of cutting consistency. Due to the frictional resistance it is not possible to pump such material without a large pressure vessel.

It should be noted that the spheres are heated by means of water vapor. The water vapor develops during the hot spheres' contact with the wet sludge. The spheres have three objectives:

a) to raise the heat capacity of the sludge mixture;

b) to improve the transport of the sludge; and c) to improve the transport and the recovery of heat.

Advantageously the spheres are heated by means of steam to 125–150° C. Water vapor from the sludge recondenses on the spheres, giving off its heat to, and thereby heating said spheres. This causes the formation of a water layer on the spheres, which preferably is removed prior to their being added to the fresh sludge. The water layer thus formed has a thickness of approx. 40 $\mu$m. It has been shown that removal of the water layer increases the capacity of the dehydration installation. This water removal process may, for instance, be effectuated by feeding the spheres through two conveyor belts made of a spongy material. This removes the water layer from the spheres.

Preferably the spheres are made of steel but they may also be made from another material such as a suitable ceramic material. The diameter of the spheres is usually 8–16 mm. In addition to the heating function, the spheres also have a mixing effect on the sludge. Characteristically, the pressure in the conveyor is at the start approx. 2 bars and at the finish approx. 0.05 bar. The mass ratio sludge/spheres is usually 1:10 to 1:30 and preferably 1:25. According to the present invention the sludge remains in the dehydrator for approx. 1–5 minutes.

Finally, the invention relates to an apparatus for carrying out the method according to the present invention. To this end the apparatus according to a preferred embodiment of the invention is characterized in that the apparatus is provided with a first tube with a screw conveyor and a shaft for intimately mixing and transporting sludge and heated spheres, and a second tube with screw conveyor with shaft for the transport of spheres to be heated, which tubes are interconnected by means of at least one pipe. The apparatus also includes a separation device for the separation of the spheres from the dehydrated sludge, sludge outlet, sludge inlet, water removal belt for the spheres, discharge for the spheres and water, and inlet for the spheres to the first tube. Notably, the first tube is provided with a vacuum pump, and the second tube is provided with a heat supply pipe.

According to another embodiment the apparatus according to the invention is characterized in that the apparatus is provided with a drum for mixing sludge which has undergone mechanical water removal with hot spheres, a first turret and a counter-revolving second turret, discharge location for the heated spheres, drum for the separation of the sludge and the spheres, and outlet for the dehydrated sludge.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiment(s) which are presently preferred. It should be understood, however, that the invention is not limited to the precise arrangements and instrumentalities shown. In the drawings:

FIG. 1a is a top view of the screw type apparatus and FIG. 1b is a side view;

DETAILED DESCRIPTION OF THE INVENTION

Figure 1:
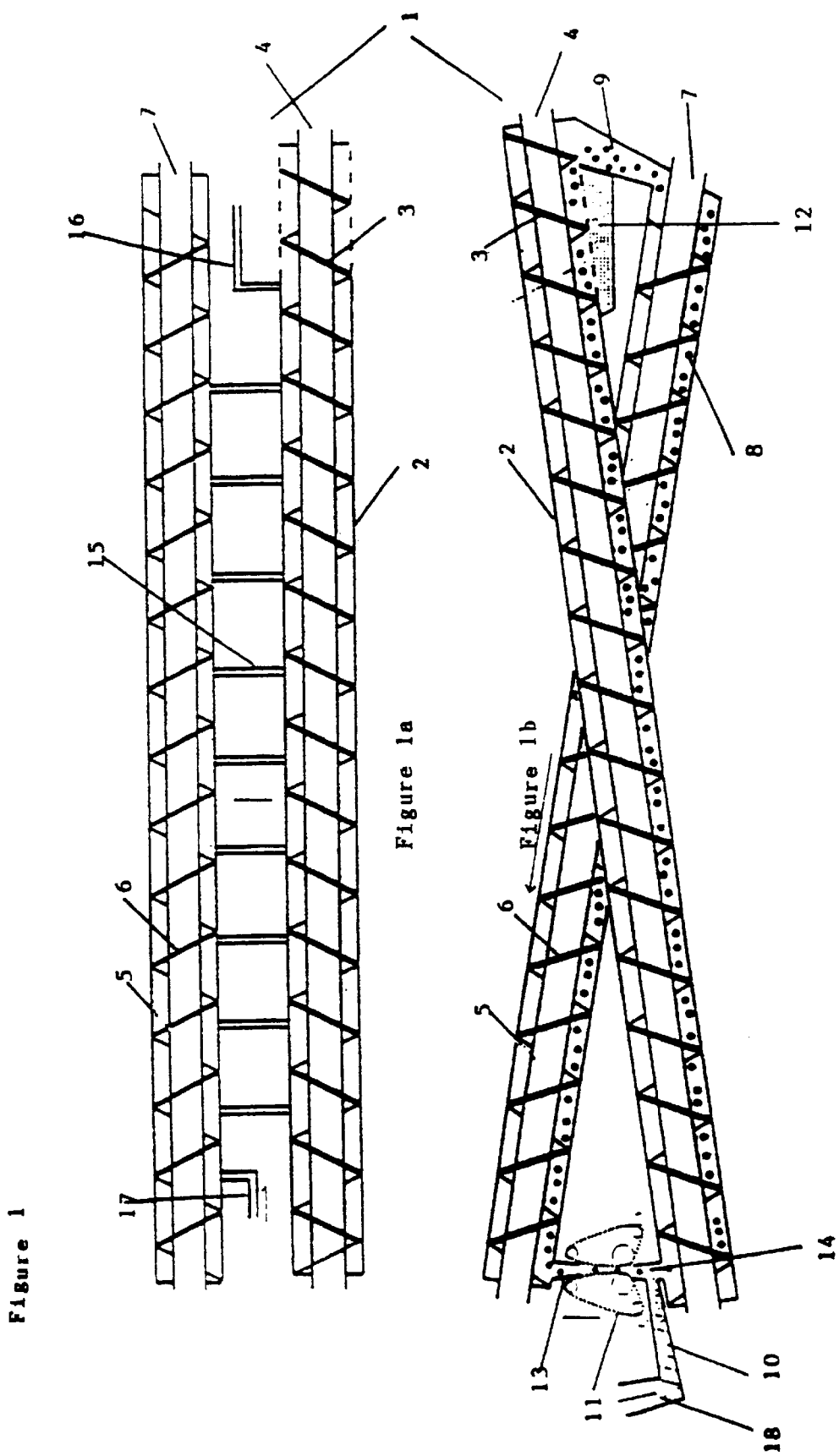
FIG. 1 shows the preferred embodiment according to the invention, wherein the apparatus is a screw type apparatus.

The preferred apparatus (1) in FIG. 1 is provided with a first tube (2), encompassing a screw conveyor (3) with shaft (4). In this tube the sludge, which has previously undergone mechanical water removal, is intimately mixed with the heated spheres, and the thus obtained mixture is transported to the separating apparatus (9), in which separation of the meanwhile cooled spheres from the dehydrated sludge takes place. The apparatus is further provided with a second tube (5), encompassing a screw conveyor (6) with shaft (7), and in which transport of the spheres (8), cooled in the first tube, takes place.

The tubes (2) and (5), usually manufactured from steel, are interconnected by at least one pipe (15). The tube (2) is provided with a sludge outlet (12) for the discharge of dehydrated sludge. Further, the apparatus according to FIG. 1 is provided with sludge inlet (10) as well as the water removal belt (11) for the spheres (8). The tube (5) is further provided with outlet (13) for the spheres, while in tube (2) an inlet (14) to the first tube (2) is provided for the spheres. Usually the first tube (2) is provided with a vacuum pump (16) for reducing the pressure in the tube system.

Further, the second tube (5) may be provided with a heat supply pipe (17) for the supply of extra heat to the spheres. In general, the spheres are made from steel but, for instance, ceramic spheres may also successfully be used.

The apparatus may be provided with an extruder (18) in which the sludge, from which water has to be removed, may be pre-heated by means of steam or another heat source. The extruder compresses the sludge into thin strands prior to being transported into the tube (2). In addition, the extruder advantageously decreases air included in the sludge.

Figure 2:
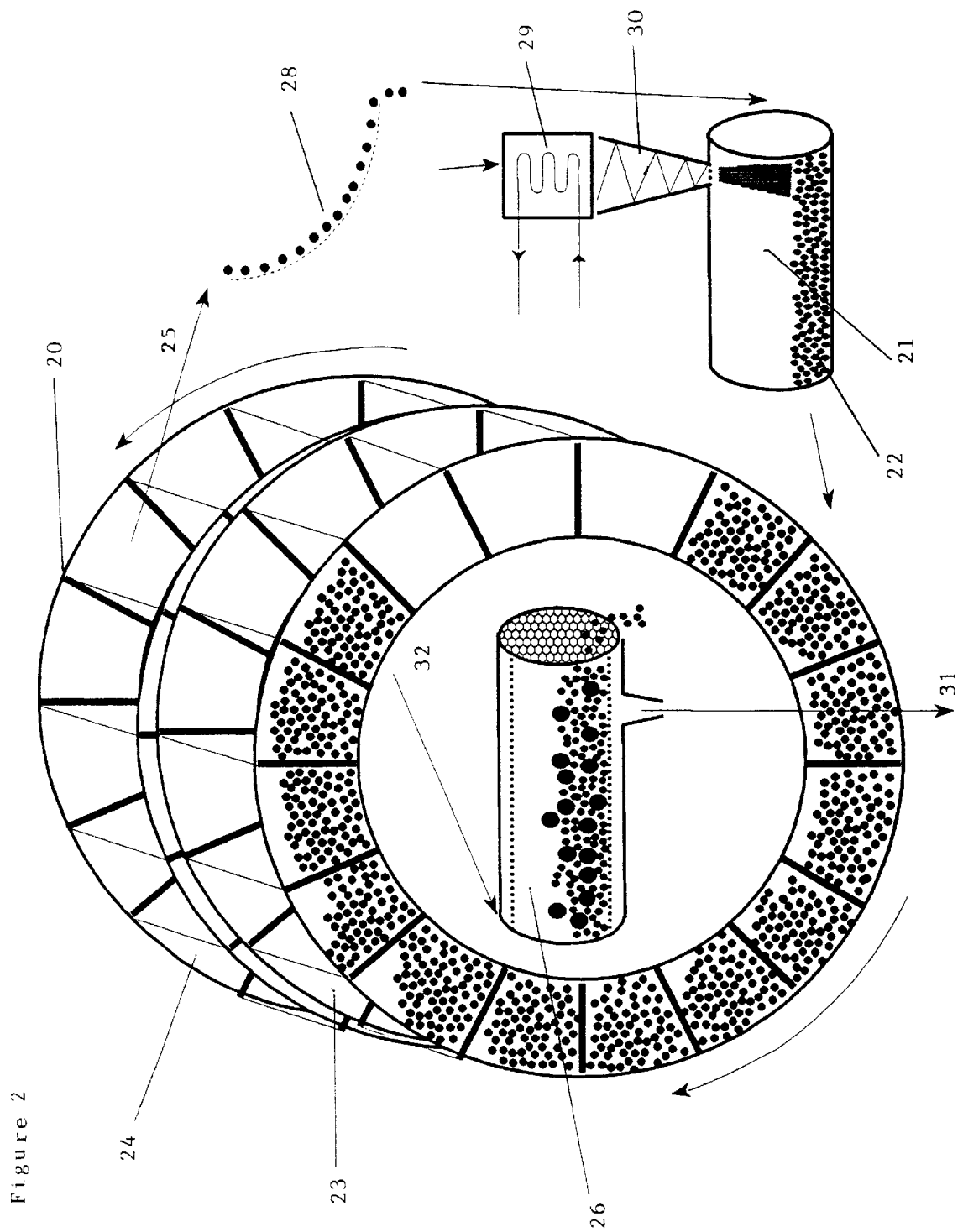
FIG. 2 shows a different embodiment of the invention, based on the turret principle.

Another favorable embodiment of the invention is shown in FIG. 2, which embodiment is based on the so-called turret principle. In FIG. 2 the apparatus (20) is provided with a drum (21) for mixing sludge, which has undergone mechanical water removal, with hot spheres (22). The drum (21) is provided with heating unit (29) for heating the sludge, for instance with steam, and an extruder (30) compressing the sludge into thin layers. The apparatus is further provided with a first turret (23) and a second turret (24) with respective compartments (32), which turrets counter-revolve in relation to each other, a compartment of the first turret always being in communication with a compartment of the second turret containing the heated spheres.

Further, the second turret (24) is provided with a discharge (25) for the discharge of heated spheres. From compartment (32) of the first turret the mixture of spheres and dehydrated sludge can be discharged under the influence of gravitational force. In the drum (26) dehydrated sludge and spheres are separated. Subsequently, the desludged spheres are conveyed into a compartment of the second turret. Drum (26) is provided with an outlet (31) for the discharge of dehydrated sludge. In the second turret (24) the cooled spheres are reheated by absorbing condensation energy. Subsequent to heating, the adhering water is removed from the spheres in a straining belt (28).

The invention will be further elucidated with reference to the included examples.

EXAMPLES 1, 2 & 3

Prior to conveying sludge from soil decontaminators into a continuous dehydration apparatus of the turret kind in accordance with the invention as shown in FIG. 1, water was removed from said sludge with the aid of a straining belt press to obtain a dry matter content of $DS_1$. The sludge was preheated to a temperature ($T_1$) after which hot spheres (temperature $T_2$, 9 mm diameter) were added to the sludge and thoroughly mixed in the first tube of the apparatus according to FIG. 1. After mixing, the temperature was $T_3$. The ratio spheres/sludge (mass ratio) was 25:1.

The pressure was gradually reduced in 10 steps to 45 millibars. This pressure reduction resulted in a gradual evaporation of water lowering the temperature to $T_4$. The water vapor formed during steps 1 to 9 is led separately to tube 5 of the apparatus according to FIG. 1, containing relatively cold spheres. Due to the condensation of the water vapor, the spheres (temperature 30° C.) are heated in nine steps (to $T_5$). By means of a vacuum pump the water vapour from step 10 was removed via a condenser. At the conclusion the dry matter content was $DS_2$. The sludge remained in the apparatus according to the invention for approximately only 5 minutes.

The results from three experiments, which experiments were conducted with two batches of sludge, are as follows:

TABLE 1

| | | Dry Matter Content (DS) | | Temperature | | | | |
|---|---|---|---|---|---|---|---|---|
| Exp. | Sludge | $DS_1$ | $DS_2$ | $T_1$ | $T_2$ | $T_3$ | $T_4$ | $T_5$ |
| 1 | 1 | 48% | 80% | 50° C. | 115° C. | 101° C. | 29° C. | 84° C. |
| 2 | 2 | 52% | 93% | 50° C. | 120° C. | 106° C. | 30° C. | 98° C. |
| 3 | 2 | 52% | 90% | 30° C. | 120° C. | 102° C. | 30° C. | 95° C. |

Table 1 shows that after treatment of the sludge according to the invention, the solid content of the dehydrated sludge was 80, 93 and 90% by weight, respectively.

To bring the spheres to the desired temperature (from $T_5$ to $T_2$), an energy input ($Q_1$) is required. This energy input is calculated per kilogram of removed water. Heating the sludge also requires energy ($Q_2$). The total energy input is the sum of these two as shown in Table 2.

TABLE 2

| Exp. | $Q_1$ | $Q_2$ | Total |
|---|---|---|---|
| 1 | 850 kJ/kg water | 195 kJ/kg water | 1045 kJ/kg water |
| 2 | 640 kJ/kg water | 177 kJ/kg water | 817 kJ/kg water |
| 3 | 770 kJ/kg water | 62 kJ/kg water | 832 kJ/kg water |

It will be appreciated by those skilled in the art that changes could be made to the embodiment(s) described above without departing from the broad inventive concept thereof. It is understood, therefore, that this invention is not limited to the particular embodiment(s) disclosed, but it is intended to cover modifications within the spirit and scope of the present invention as defined by the appended claims.

We claim:

1. A method for the continuous dehydration of sludge comprising the steps of:
   mechanically removing water from the sludge prior to dehydration to obtain a sludge of cutting consistency;
   mixing the sludge of cutting consistency with heated spheres;
   dehydrating the sludge of cutting consistency at reduced pressure, wherein due to the contact of the spheres with the sludge, the spheres give off their heat to the sludge, causing water from the sludge to evaporate and the spheres to cool;
   separating the dehydrated sludge and the cooled spheres from each other;
   removing the dehydrated sludge;
   re-heating the cooled spheres with water vapor formed in the dehydration step; and
   adding the re-heated spheres to fresh sludge to be dehydrated.

2. The method according to claim 1, wherein the spheres are made from steel.

3. The method according to claim 2, wherein the diameter of the spheres is 8–16 mm.

4. The method according to claim 1, wherein the pressure in the method is at the start about 2 bars and at the finish about 0.5 bar.

5. The method according to claim 1, wherein the mass ratio sludge/spheres is about 1:10 to 1:30.

6. The method according to claim 1, wherein the mass ratio sludge/spheres is about 1:25.

7. The method according to claim 1, wherein the dehydration step takes about 1–5 minutes.

8. The method according to claim 1, comprising heating the spheres to 125–150° C.

9. The method according to claim 1, comprising heating the spheres by condensing water vapor from the dehydration step.

10. The method according to claim 1, comprising removing a water layer acquired by the spheres during its contact with the water vapor, wherein the layer is removed prior to mixing of the spheres with the sludge of cutting consistency to be dehydrated.

11. The method according to claim 10, comprising feeding the spheres through two conveyor belts made of a spongy material to remove the water layer.

12. The method according to claim 1, comprising supplying extra heat to the spheres through a pipe.

13. The method according to claim 1, comprising compressing the sludge into thin strands in an extruder prior to being mixed with spheres.

14. The method according to claim 13, comprising supplying extra heat to the sludge to be dehydrated from a heat source connected with the extruder.

15. An apparatus for continuous dehydration of sludge wherein, prior to dehydration, water is mechanically removed from the sludge, and the thus obtained sludge of cutting consistency is mixed with heated spheres, comprising a first tube (2) with a screw conveyor (3) and a shaft (4) for intimately mixing and transporting sludge and heated spheres, and a second tube (5) with screw conveyor (6) with shaft (7) for the transport of spheres (8) to be heated, which tubes are interconnected by means of at least one pipe (15), a separation device (9) for separation of the spheres from the dehydrated sludge, a sludge outlet (12), a sludge inlet (10), a water removal belt (11) for the spheres (8), a discharge (13) for the spheres, and an inlet (14) for the spheres to the first tube (2).

16. The apparatus according to claim 15, wherein the first tube (2) is provided with a vacuum pump (16).

17. The apparatus according to claim 15, wherein the second tube (5) is provided with a heat supply pipe (17).

18. An apparatus for continuous dehydration of sludge wherein, prior to dehydration, water is mechanically removed from the sludge, and the thus obtained sludge of cutting consistency is mixed with heated spheres, comprising a drum (21) for mixing sludge which has undergone mechanical water removal with hot spheres (22), a first turret (23) and a counter-revolving second turret (24) having respective compartments (32), a discharge location (25) for the heated spheres, a drum (26) for separation of the dehydrated sludge and the spheres, and an outlet (31) for the dehydrated sludge.

\* \* \* \* \*